United States Patent [19]

Nurse

[11] Patent Number: 5,482,621

[45] Date of Patent: * Jan. 9, 1996

[54] SEPTIC TANK OUTLET FILTER

[76] Inventor: Harry L. Nurse, 12207 Plantation Blvd., Goshen, Ky. 40026

[*] Notice: The portion of the term of this patent subsequent to Jan. 17, 2012, has been disclaimed.

[21] Appl. No.: 225,628

[22] Filed: Apr. 11, 1994

Related U.S. Application Data

[63] Continuation-in-part of Ser. No. 103,711, Nov. 1, 1993, Pat. No. 5,382,357.

[51] Int. Cl.$^6$ .................................... B01D 21/24
[52] U.S. Cl. .................. 210/170; 210/435; 210/532.2; 210/460; 210/470
[58] Field of Search .................... 210/170, 172, 210/237, 238, 323.2, 337, 338, 342, 435, 451, 452, 470, 532.2, 536, 538, 540

[56] References Cited

U.S. PATENT DOCUMENTS

| | | | |
|---|---|---|---|
| 2,364,472 | 12/1944 | Piatt | 210/532.2 |
| 2,606,663 | 8/1952 | Blackman et al. | 210/451 |
| 2,900,084 | 8/1959 | Zabel | 210/532.2 |
| 3,332,552 | 7/1967 | Zabel | 210/532.2 |
| 4,082,676 | 4/1978 | Dulger | 210/451 |
| 4,179,372 | 12/1979 | Rosaen | 210/238 |
| 4,278,455 | 7/1981 | Nardi | 210/451 |
| 4,439,323 | 3/1984 | Ball | 210/532.2 |
| 4,710,295 | 12/1987 | Zabel | 210/532.2 |
| 4,931,180 | 6/1990 | Darchambeau | 210/451 |
| 5,207,896 | 5/1993 | Graves | 210/532.2 |
| 5,242,584 | 9/1993 | Hoarau | 210/532.2 |

Primary Examiner—Robert A. Dawson
Assistant Examiner—Robert James Popovics
Attorney, Agent, or Firm—Middleton & Reutlinger; Charles G. Lamb

[57] ABSTRACT

Filter device useful in continuous separation of solid matter from a fluid, such as liquid wastewater where the filter includes a tubular filter element with a series of slots of selected width extending through the tubular element.

The element has a central opening and can be received in a casing to form an annular area between the tubular filter element and the casing so the central opening is open to receive the fluid to be filtered as the fluid flows through the slots from the central opening to the annular area. The casing can also include an outlet from the annular area so the fluid can be emitted from the assembly. A seal can be provided between the tubular element and the inside of the casing at a location below the slots in the tubular element and above the outlet from the casing.

A tubular filter element is composed of two identical halves which are mated to form the element with an integral stop at one end to seal to engage a cooperative stop in the casing receiving the element and a seal at the opposite end of the element to engage the inner surface of the casing.

3 Claims, 3 Drawing Sheets 5,482,621

SEPTIC TANK OUTLET FILTER

This Application is a continuation-in-part of my application Ser. No. 08/103,711 filed Nov. 1, 1993, now U.S. Pat. No. 5,382,357.

BACKGROUND OF THE INVENTION

The present invention relates in general to filter devices and more particularly relates to a new fluid filter device composed of a tubular element with slots of selected width disposed in a casing with seals between the element and the casing to provide a highly effective filter which has improved efficiency at lower cost than other arrangements because of advantages available in the design of devices within the scope of the present invention. Devices within the scope of the present invention are particularly useful in filtering particulate matter from liquids such as in the effluent from wastewater treatment facilities such as septic tanks.

A wide variety of filter devices for such purposes are known in the art such as stacked disc-dam filter elements taught in U.S. Pat. Nos. 2,900,084 and 3,332,552. These teachings have provided filter elements which have proved highly effective for removal of solid matter from fluids, particularly for treatment of sewage in septic tanks and for removal of other solid matter from liquids.

Other devices are taught in U.S. Pat. Nos. 4,439,323 and 4,179,372 but none has the effectiveness of devices within the scope of the present invention, particularly at the cost of devices within the scope of the present invention.

Another prior art device offered by Orenco Systems Inc. is composed of a openwork basket located in a casing where filtration is accomplished by passage of fluid through the openings in the basket. Such devices have limited flow capabilities and tend to clog easily. In general, some of the prior art devices have proven effective but are expensive and have resulted in mechanical and other problems associated with the plugging and cleaning.

In general, no prior art device is known which provides the features, advantages and cost effectiveness of devices within the scope of the present invention.

SUMMARY OF THE INVENTION

The present invention relates in general to filter devices for removal of solid material from fluids and more particularly relates to improved slotted filter elements.

Devices within the scope of the present invention allow streamlined fluid flow and improve overall performance of the filter and significantly reduce the cost of the assembly relative to the cost of other type filters to accomplish the same purposes.

Moreover, it has been found that devices within the scope of the present invention unexpectedly provide increased capacity in the same volume as other filters and thereby significantly reduce both installation and material cost.

Additionally devices within the scope of the present invention allow treatment of effluent material beyond removal of solid matter from the fluid. Specifically, the filters within the scope of the present invention can be adapted to be self cleaning so that it is not generally necessary to open the filter for cleaning.

Briefly, the present invention provides filter device useful in continuous separation of solid matter from a fluid such as liquid where the filter includes a tubular filter element with a series of slots of selected width extending through the tubular element.

The element has a central opening and can be received in a casing to form an annular area between the tubular filter element and the casing so the central opening is open to receive the fluid to be filtered as the fluid flows through the slots from the central opening to the annular area. The casing can also include an outlet from the annular area so the fluid can be emitted from the assembly. A seal can be provided between the tubular element and the inside of the casing at a location below the slots in the tubular element and above the outlet from the casing.

Arrangements within the scope of the present invention provide further advantages in that the filter element can be easily installed into standard size pipe used in plumbing and for other purposes so the filter element can be retrofit into existing facilities without substantial modification of the facilities.

In one arrangements within the scope of the present invention a particularly effective filter assembly can be composed of two identical mating halves to lower fabrication cost and can be designed to facilitate installation in standard pipe fittings to further reduce installed cost and facilitate cleansing and other operations to reduce cost.

Examples of arrangements within the scope of the present invention are illustrated in the accompanying drawings and described hereinafter but it will be understood that neither the drawings nor the descriptions thereof are presented by way of limitation and that other arrangements also within the scope of the present invention will occur to those skilled in the art upon reading the disclosure set forth hereinafter.

BRIEF DESCRIPTION OF THE DRAWINGS

Examples of arrangements within the scope of the present invention are illustrated in the accompanying drawings wherein.

DETAILED DESCRIPTION OF THE DRAWINGS

Figure 1:
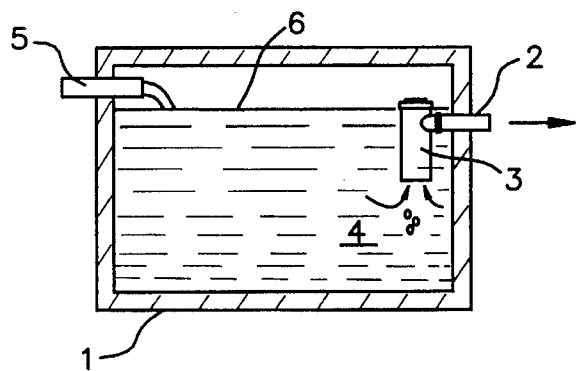
FIG. 1 is a cross-sectional elevational view of an example of a device within the scope of the present invention in a septic tank in a sewage treatment application.
Figure 2:
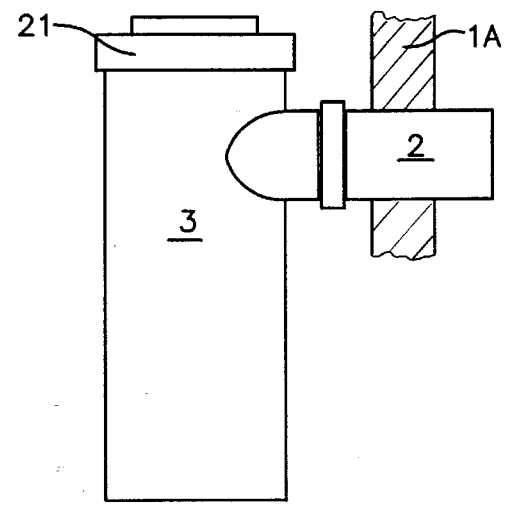
FIG. 2 is an enlarged detailed view of one example of a device within the scope of the present invention.

FIG. 1 is an elevational view of an example of a filter device 3 within the scope of the present invention in a septic tank 1 in a sewage treatment application. The fluid to be filtered is admitted through an inlet 5 as shown. A level 6 of the fluid is maintained in the tank 3 and filtered liquid is emitted by means of an outlet 2. FIG. 2 is an enlarged view showing the filter element 3 in place with the outlet 2 extending through wall 1A of the tank.

Figure 3:
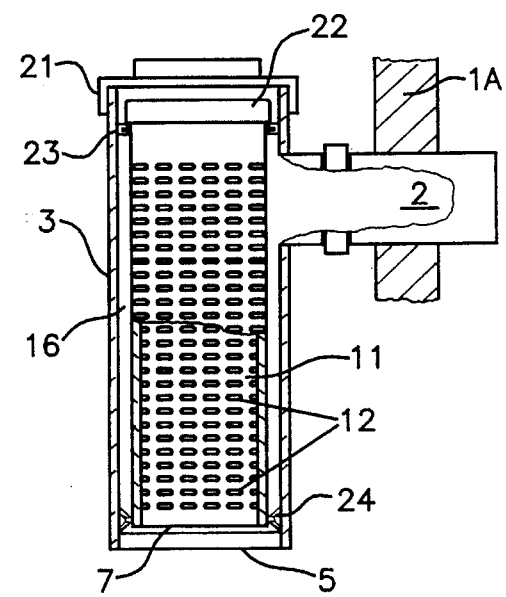
FIG. 3 is an enlarged detailed view of an example of a device within the scope of the present invention in partial cross-section.

Referring now to FIG. 3 which shows an example of a filter device in accordance with the present invention fluid to be treated enters the device through an opening 5 at the bottom of casing 3.

A filter arrangement is located in the casing 3 including to remove the material 4 removed from the fluid. The filter arrangement includes a tubular element 11 with slots 12 as shown in FIG. 3 or the slots 14 of a tubular element 13 as illustrated in FIG. 4.

Figure 4:
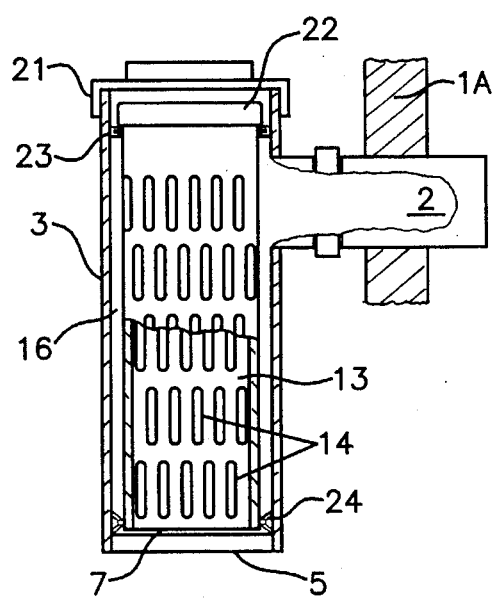
FIG. 4 is an enlarged detailed view of another example of a device within the scope of the present invention in partial cross-section.

In FIG. 3 the slots 22 extend circumferentially while in FIG. 4 the slots 14 run vertically. In both cases the width of the slots is advantageously equal to the maximum mean diameter of the particles which can pass to the effluent.

It has been found that the slots can be located in virtually any orientation and that the filtration can be successfully accomplished regardless of the orientation of the slots. It has further been found that filter arrangement in accordance with the present invention as shown in the Figures can be generally self cleaning because the flow of liquid through the slots tends to sweep the particulate material out of the slots to fall through the opening 7 of the filter of FIG. 3 and the opening 8 of the filter of FIG. 4.

Several procedures can be used to produce the filter elements within the scope of the present invention. In one case the filter element can be a plastic tube where the slots are simply cut into the element. In other cases other procedures can be used. For example, the filter element can be molded in elongate sections and the sections fastened together along their edges, for example by adhesive. In these cases, and particularly where the filter element is molded in two halves which are assembled to form the tubular element the internal configuration of the slots 12 and 14 can be adjusted as shown in FIGS. 6A and 6B to enhance the self cleaning capabilities of the filter.

Figure 6A:
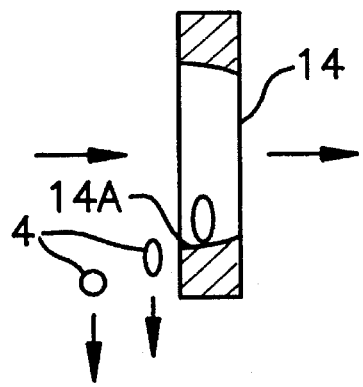
FIG. 6A is an enlarged detailed view in cross-section of an example of a slot of a device within the scope of the present invention.
Figure 6B:
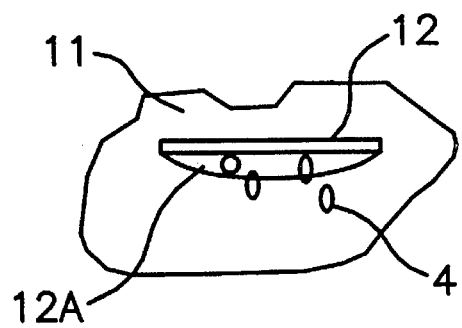
FIG. 6B is an enlarged detailed view in cross-section of another example of a slot of a device within the scope of the present invention.

FIG. 6A is an illustration of a cross-sectional segment of the wall 13 of the filter arrangement shown in FIG. 6A where the slots run generally vertically. In FIG. 6A the slots 14 extend through the wall 13 but the edges 14A have been rounded as shown to provide a guide for emission of particulate matter 4 from the slot. The capability to direct the particulate matter from the slot enhances the self cleaning capability of the device. FIG. 6B is an illustration of one example of a slot configuration which can be used with devices of the type shown in FIG. 3 where the slots run generally horizontally. In FIG. 6B the slot 12 is shown to be formed with a lip 12A which facilitates flow of the particulate matter 4 from the slot 12.

As shown in FIGS. 3 and 4 the tubular filter elements 11 and 13 respectively are received in the outer casing 3 to form an annular flow area 16 between the filter element and the casing 3 which receives the effluent which has passed through the slots of the filter element. In each case a seal is provided between the filter element and the casing 3 at the top and bottom of the flow area to isolate the effluent from the rest of the system.

Figure 5:
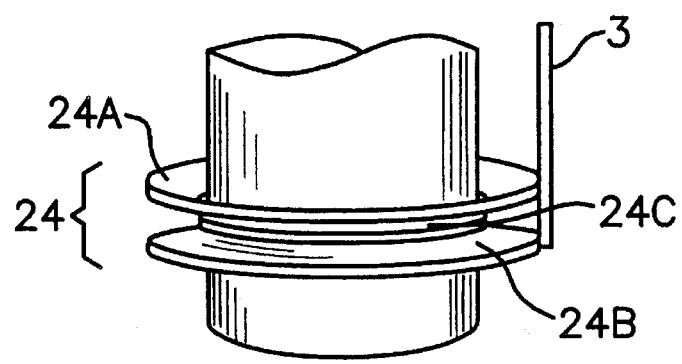
FIG. 5 is an enlarged detailed view of one example of a seal arrangement within the scope of the present invention in partial cross-section.

An example of a bottom seal is shown in FIG. 5A to include a flexible ring 24 which can be attached to the bottom of the tubular element, in this case the element 11, and can be provided with two outwardly extending leaves 24A and 24B which engage the innerside of the casing 3 as shown to form a seal to prevent bypass of fluid from the tank 1 directly to the outlet 2. At the upper end, the tubular filter element 11 or 13 can be provided with a cap 22 as shown in FIGS. 3 and 4. A ring seal 23 can be provided on the inner periphery of casing 3 and adapted to seal the filter cartridge in the tube and to support the filter cartridge in the casing 3. An outlet 2 is provided from the filter device for emission of treated fluid.

While examples within the scope of the present invention are illustrated and discussed with reference to sewage treatment it will be understood that devices within the scope of the present invention can be equally effectively used in other applications for example the removal of sand and the like from drainage water.

Figure 7:
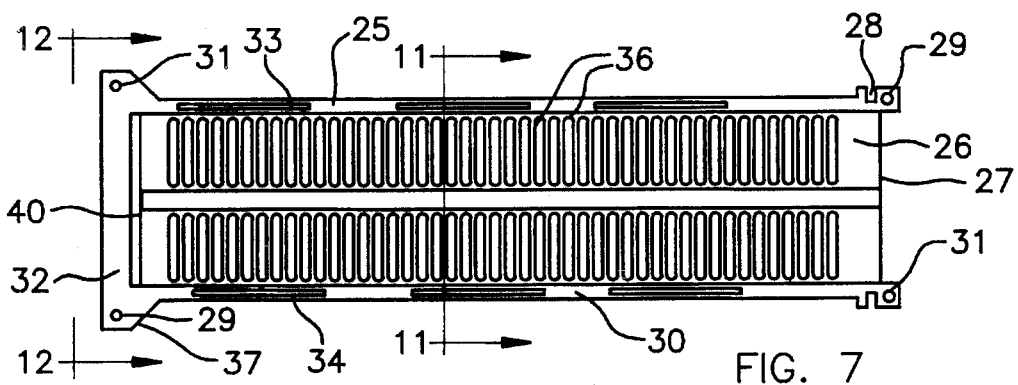
FIG. 7 is a plan view of the inside of an example of a part of a filter element within the scope of the present invention.
Figure 8:
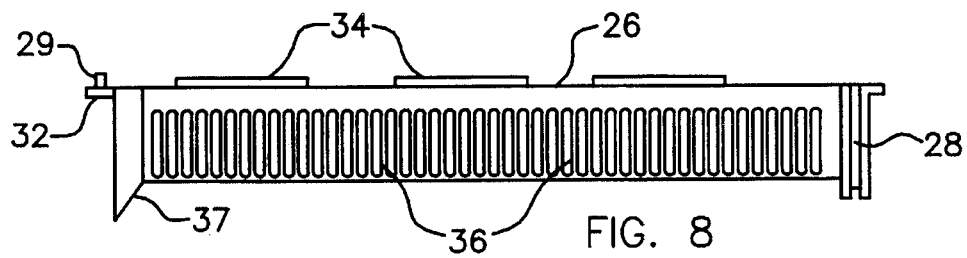
FIG. 8 is side view of the example of a part of a filter element within the scope of the present invention shown in FIG. 7.

FIGS. 7–11 illustrate yet another arrangemnt within the scope of the present invention where a filter assembly of within the scope of the present invention is composed of two identical mating halves an example of which is shown in FIGS. 7 and 8. In FIG. 7, which is a top view of the inside of the element, the filter includes a body 26 with filter slots 36 of selected width where several slots are provided on the circumference of the element in narrowly spaced side by side relationship.

Figure 11:
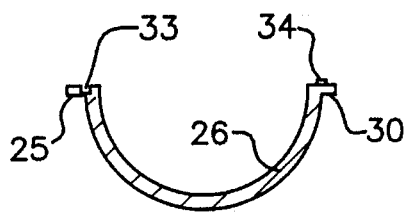
FIG. 11 is view taken through a plane passing through line 11—11 of FIG. 7.
Figure 12:
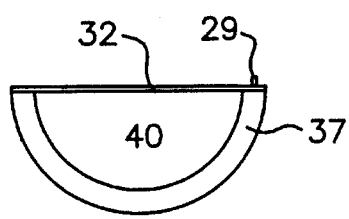
FIG. 12 is a view taken along a plane passing through line 12—12 of FIG. 7.

Connecting surfaces 25 and 30 are provided on opposite sides of the element where detents 34 are provided on the surfaces 30 and grooves 33 are provided on the surface 35 as also shown in FIG. 11. When two of the elements 26 are assembled the detents 34 of one element are received in the grooves 33 of the other element so the two halves can be assembled and form the filter. Advantageously, in such arrangements it is only necessary to make one element to form the filter assembly so that the fabrication cost is substantially reduced.

In addition to the detents 34 and grooves 33 the filter elements 26 can have posts 29 located on diagonal ends and holes 31 which receive the posts to further ensure assembly of the elements.

Figure 10:
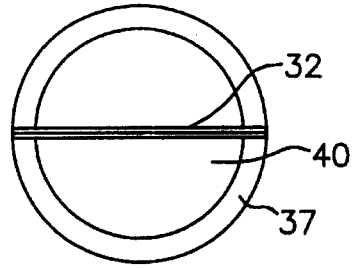
FIG. 10 is an end view of an example of a filter element within the scope of the present invention composed of elements of the type shown in FIG. 7.
Figure 9:
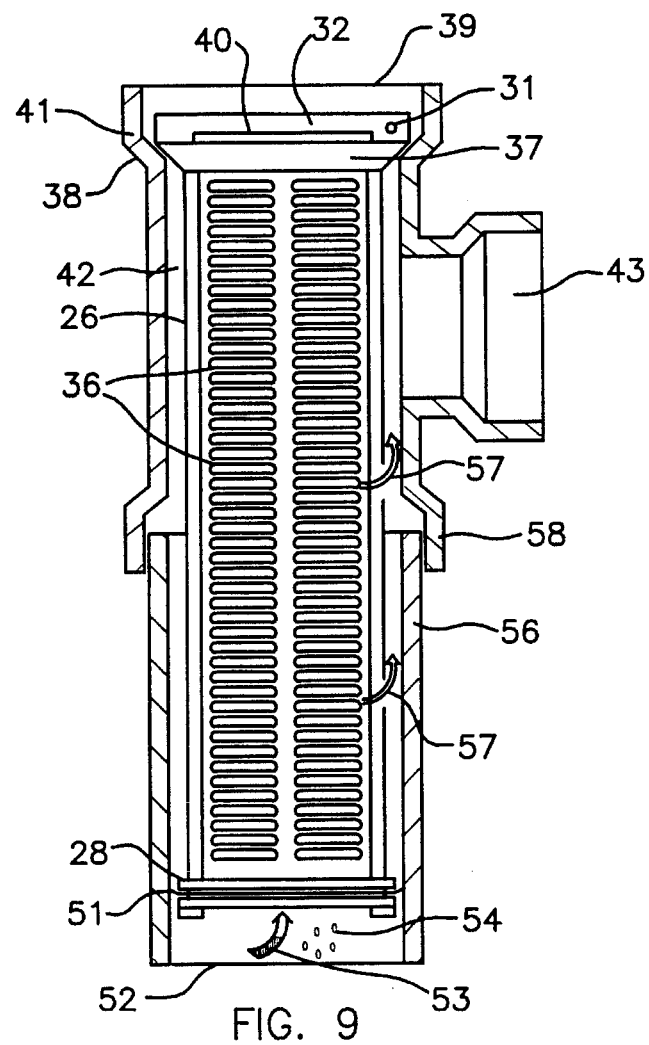
FIG. 9 is a side view of the example of a filter element within the scope of the present invention shown in FIG. 7 located in a casing.

It is necessary to provide a seal between the outer surface if the bottom end 27 of the element 26 and the casing which receives the element as shown in FIG. 9 and discussed hereinafter and in this regard a circumferential groove 28 can be provided adjacent the bottom end 27 to receive a ring seal 51. Two of the elements 26 are assembled as shown in FIG. 10 to form a full filter element and mutually engageable handles 32 are provided on each of the elements to provide means to insert and retract the element in a casing as illustrated in FIG. 9.

It is necessary to suspend the assembled filter element in a pipe or similar enclosure as illustrated in FIG. 9 and in this regard a stop 37 can be molded in the element 26 at the top end 40. The stop provides functionality in that it can be adapted to be received in standard pipe fittings to avoid the cost of fabrication of special enclosures for the filter and further can allow insertion of the unit into existing piping. In service the stop suspends the element in the receiving enclosure of the type shown in FIG. 9 where standard piping tee 41 is provided and as shown the stop 37 engages the transition section 38 of the tee to suspend the filter element in the tee and the pipe 56 which is received in the opening 58 of tee 41 opposite the end 39.

The filter element is sized and adapted to be suspended in the tee 41 and pipe 56 to define an annular area 42 therebetween to receive cleaned fluid 57 passing through the slots 36. The cleaned fluid 57 passes through the annular area 42 and to the outlet 43 for emission from the system.

Also, as described with reference to the prior arrangements, the end 52 of pipe 56 is open so that water 53 or other fluid to be cleaned enters the open end 27 of the filter 26 and materials 54 rejected by the filter fall back into the enclosure holding the assembly.

It will be understood that the foregoing are examples are not by way of limitation and that other arrangements also within the scope of the present invention will occur to those skilled in the art upon reading the disclosure set forth hereinbefore.

The invention claimed is:

1. In combination with a septic tank, a filter device useful in continuous separation of solid matter from a fluid including: a tubular filter element including two mated half elements each with a series of slots of preselected width extending through each of said half elements and where each of said half elements has first and second longitudinally extending sides and connector means to connect said half elements wherein said tubular element is formed having a central opening at a lower end defining an inlet, and a top end; tubular casing means to receive said tubular filter element to form an annular area between said tubular filter element and said casing, and define outlet means; seal means are provided between said tubular filter element and the casing at both the top and lower ends of said element to prevent bypass flow of the fluid to be filtered wherein fluid to be filtered is received in said central opening and flows upwards through said slots from said central opening to said annular area and through said outlet means.

2. The invention of claim 1 wherein said connecting means include detent means on one of said first and second sides and detent receiving groove means on the other of said first and second sides.

3. The invention of claim 1 including handle means adjacent said top side.

* * * * *